United States Patent [19]

Chau et al.

[11] Patent Number: 5,745,727
[45] Date of Patent: Apr. 28, 1998

[54] LINKED CACHES MEMORY FOR STORING UNITS OF INFORMATION

[75] Inventors: Vi Chau, Laguna Niguel; Stuart Berman, Newport Beach; Peter Fiacco, Yorba Linda, all of Calif.

[73] Assignee: Emulex Corporation, Costa Mesa, Calif.

[21] Appl. No.: 843,315

[22] Filed: Apr. 15, 1997

Related U.S. Application Data

[63] Continuation of Ser. No. 452,274, May 26, 1995, abandoned.
[51] Int. Cl.[6] .................................................. G06F 12/08
[52] U.S. Cl. .............................................. 395/449; 395/446
[58] Field of Search ................................. 395/449, 446, 395/460, 444, 445

[56] References Cited

U.S. PATENT DOCUMENTS 4,670,839  6/1987  Pilat et al. ........................... 395/446
5,390,318  2/1995  Ramakrishnan et al. ............. 395/485

OTHER PUBLICATIONS

Hennessy et al., "Computer Architecture A Quantitative Approach", 1990, 471–473.

Primary Examiner—Tod R. Swann
Assistant Examiner—Kevin L. Ellis
Attorney, Agent, or Firm—Fish & Richardson P.C.

[57] ABSTRACT

A method and apparatus for linking two independent caches which have related information stored therein. Each unit of information stored in a first cache memory is associated with one unit of information stored in the second cache memory. Each unit of information stored in the first cache memory includes a pointer or index to the associated information unit in the second cache memory. Each information unit stored in the second cache is only stored once, regardless of the number of units in the first cache that are associated with a particular unit within the second cache. Therefore, even if more than one unit of information within the first cache memory is associated with the same unit of information within the second cache memory, that unit of information stored in the second cache memory is only stored once.

14 Claims, 3 Drawing Sheets

FIG. 3

LINKED CACHES MEMORY FOR STORING UNITS OF INFORMATION

This is a continuation of application Ser. No. 08/452,274, filed May 26, 1995, now abandoned.

BACKGROUND OF THE INVENTION

1. Field of the Invention

This invention relates to a method and apparatus for storing information in a computer memory, and more particularly to efficiently storing, in a computer cache, context information related to frames of data received over a communications link.

2. Description of Related Art

Nearly every computer system relies on information that is stored in memory or storage. In some cases the information that is stored comprises operational instructions, in other cases the information is data. In either case, the time required to recover information from a memory or storage device can be a limiting factor in the operation of the system. Furthermore, memory or storage devices are typically priced by the speed at which they operate (i.e., faster memory devices typically cost more per unit of information storage capability than slower memory devices). Accordingly, the use of a cache memory has become a common way to increase the speed of data recovery from system storage or memory without substantially increasing the cost of the memory.

The premise behind the use of cache memory is that by providing a relatively small, fast memory and storing in that memory the most frequently, or most recently, used information, the average amount of time required to recover information from memory will be reduced. Accordingly, when information is requested from memory, a cache controller searches the cache to determine whether the information is present. If the information is present (referred to as a "cache hit"), then the information is read from the fast cache device. If the information is not present in the cache (referred to as a "cache miss"), then the information must be read from the main memory. In accordance with one method for caching, when a cache miss occurs, information is loaded into the cache for the next attempt to recover that information. However, a number of different algorithms are known for determining what information should be loaded into a cache.

Since cache memory is relatively expensive due to its speed, memory space within the cache is a highly valued commodity which is best used as efficiently as possible. The more efficiently the cache is used, the smaller the cache may be and still provide the same level of performance. In the alternative, for a cache of a fixed size, the more efficient the cache, the faster the system will recover data from memory, since more information will be present within the cache and so there will be a greater chance of a cache hit.

One situation in which a cache is used is in a communications protocol controller, such as a Fibre Channel Sequence and Exchange Manager. The cache is used to store context information related to an incoming frame of information. More particularly, each frame of information in accordance with the Fibre Channel protocol is associated with other frames of information which are part of the same "conversation" between devices (referred to as an "Exchange"). Overhead information associated with each frame (referred to as the "Exchange Context") allows a protocol management engine to record the transmission and reception of data, reorder the frames, and perform other processes required by the protocol in the management of the communications link. In addition to the Exchange Context, each frame is associated with state information that identifies characteristics related to the device at the other end of the communications link, referred to as the "Remote Port Context". Typically, the Exchange Context of each frame within the same Exchange is identical. However, the Exchange Contexts associated with frames of different Exchanges are different. In addition, the Remote Port Context of frames being transferred to or from the same remote port (i.e., the port at the other end of the transfer) are typically the same. However, transfers to or from other ports will have a unique Remote Port Context. Accordingly, two frames which are associated with different Exchanges, but which are received from the same remote port, will have the same Remote Port Context, but will have different Exchange Context. Typically, the context (i.e., both Remote Port Context and Exchange Context) for each received frame is stored in a single location which is addressed using information that is stored in a memory. In some cases, a cache is used. When a cache is used, the context is retrieved from the cache, if the information is currently present in the cache. Otherwise, the information is retrieved from memory. The cache must be relatively large in order to store each Exchange Context and Remote Port Context.

In light of the expense of cache memory and the desire to use cache memory more efficiently, it would be desirable to provide a more efficient means for storing context information in a context cache. The present invention provides such a means.

SUMMARY OF THE INVENTION

The present invention is a method and apparatus for linking two independent caches which have related information stored therein. In the present invention, each unit of information stored in a first cache memory is associated with one unit of information stored in the second cache memory. Each unit of information stored in the first cache memory includes an index to the associated information unit in the second cache memory. Accordingly, the caches are "linked". By using two linked caches, the total amount of cache memory is reduced in systems in which there would be redundancy in the information that is stored in second cache. In such systems, redundancy is the result of some of the information units stored in the second cache being associated with more than one information unit stored in the first cache.

In accordance with the present invention, each information unit stored in the second cache is only stored once, regardless of the number of units in the first cache that are associated with a particular unit within the second cache. For example, a block of information in accordance with the present invention includes an information unit (such as an "Exchange Context") stored within the first cache and an information unit (such as a "Port Context") stored within the second cache. Associated with each Exchange Context is a pointer or index (a "Port Context Index") to an associated Port Context within the second cache. In the preferred embodiment of the present invention, the Port Context Index is embedded within the Exchange Context. Therefore, even if more than one Exchange Context is associated with the same Port Context, the associated Port Context is only stored once.

If a requesting device requests a block of information, a first cache controller searches the first cache to determine whether the Exchange Context is present in the first cache.

If the Exchange Context is not present in the first cache, then the first cache controller informs a coordination control logic device to request that a microcontroller read the Exchange Context from a main context memory array (i.e., a "context array"). The Exchange Context information read from the context array is stored in the first cache. In accordance with the present invention, the Port Context Index in the first cache is used to direct the second cache controller to associated Port Context information within the second cache. That is, the Port Context Index is communicated from the first cache to the second cache controller. The second cache controller then attempts to locate the Port Context information associated with the Exchange Context retrieved from the first cache. If the Port Context information is found, then both the Port Context information and the Exchange Context information are presented to the requesting device.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1:
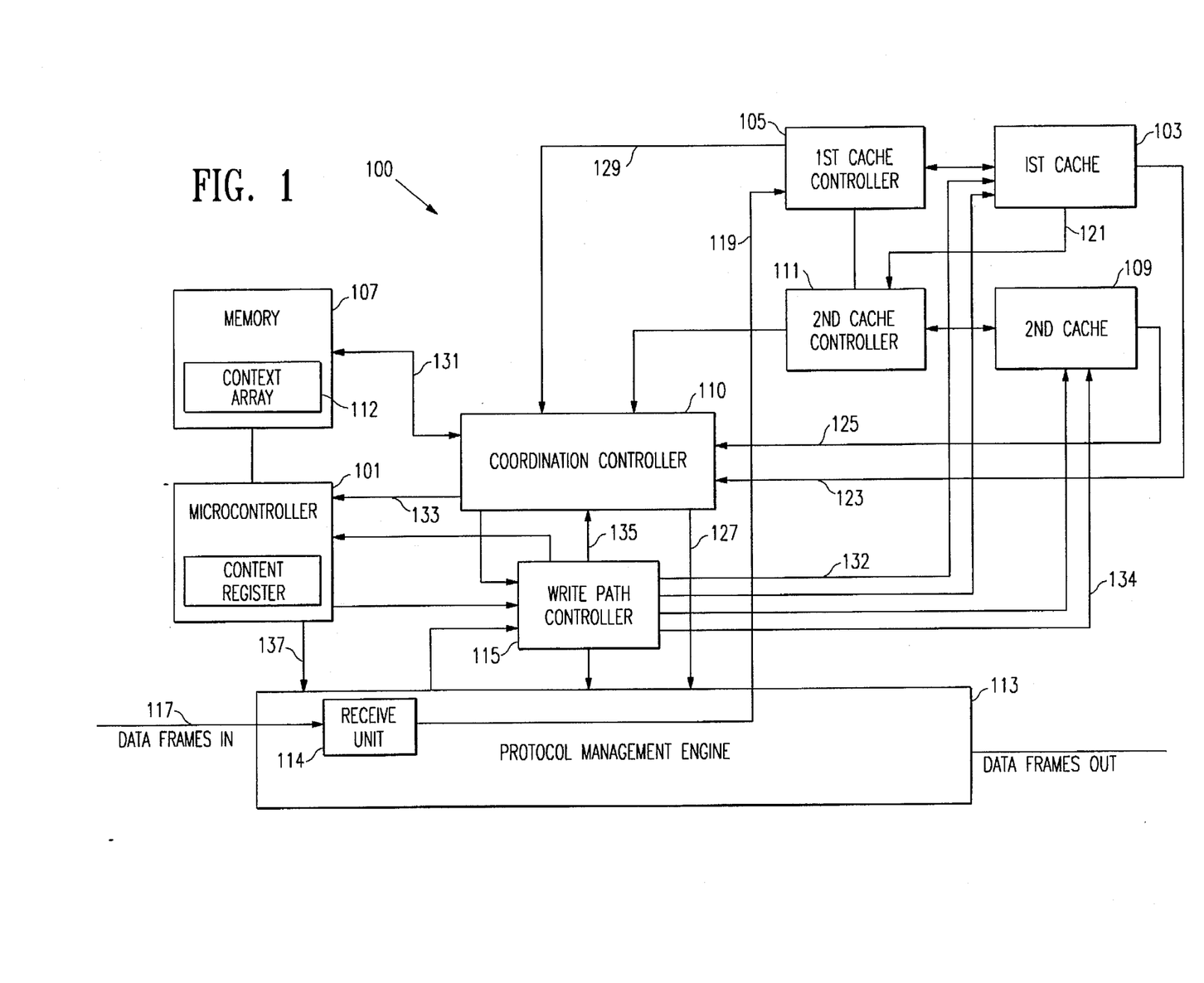
FIG. 1 is a block diagram of one embodiment of the present invention.

FIG. 1 is a block diagram of the present invention in the context of a Fibre Channel communications adapter 100 for a host computer. The communication adapter 100 receives and transmits frames of data over a Fibre Channel link between the communications adapter 100 and a remote device (not shown). It will be understood by those skilled in the art that the present invention has utility in devices other than communications adapters. For example, the present invention may be used in any system in which a first unit of information is stored together with an associated second unit of information.

The embodiment of the present invention illustrated in FIG. 1 includes a microcontroller 101, a first cache 103, a first cache controller 105, a second cache 109, a second cache controller 111, a coordination controller 110, and a protocol management engine 113 which includes a receive unit 114 to handle receiving data frames. The microcontroller 101 provides most of the intelligence in the communications adapter 100. A memory device 107 (such as a conventional RAM, magnetic disk drive, optical disk drive, flash RAM, or other device for storing data) is coupled to the microcontroller 101. The memory device 107 preferably includes a context array 112. The context array 112 includes units of information associated with either the first cache 103 or the second cache 109.

The first cache 103 stores those units of information (such as "Exchange Context") associated with the first cache 103 which have most recently been requested (e.g., in accordance with the well-known "direct mapped-copy back" algorithm). The second cache 109 stores those units of information (such as "Port context") associated with at least one corresponding unit of information in the first cache 103.

In accordance with the embodiment of the invention illustrated in FIG. 1, the first cache controller 105 receives requests for an Exchange Context associated with a particular frame of data that either has been recently received or is to be transmitted. The coordination controller 110 ensures that misses from the cache (i.e., unsuccessful attempts to read information from a cache 103, 109) are handled properly (as will be explained in detail below), and that information is output from each cache 103, 109 only when both caches have a hit (i.e., the information sought is found within both caches 103, 109). The first and second caches 103, 109 operate in a manner that appears to external devices as though the two "linked" caches 103, 109 are a single "virtual" cache that stores both the Exchange Context and the Port Context at a single location.

In accordance with one embodiment of the present invention, the first and second cache controllers 105, 111 are implemented as a single state machine. Operations of the first and second cache 105, 111 are preferably sequential. That is, only after the first cache controller 105 finds a requested Exchange Context does the second cache controller 111 begin searching for the associated Port Context. Preferably, the coordination controller 110 is implemented as a second state machine. A Write Path Controller 115 is preferably implemented as a third state machine. Accordingly, the cache controllers 105, 111, the coordination controller 110, and the Write Path Controller 115 each are preferably independent devices within the communications adapter 100.

Operation of One Embodiment of the Present Invention

The following description of the operation of the present invention is provided in the context of a communications adapter for ease of understanding. That is, by explaining the operation of the present invention in the context of a communications adapter, a person skilled in the art will gain a better understanding of the benefits of the present invention. However, it should be understood that the linked caches of the present invention are well suited to a wide range of uses.

Figure 2A:
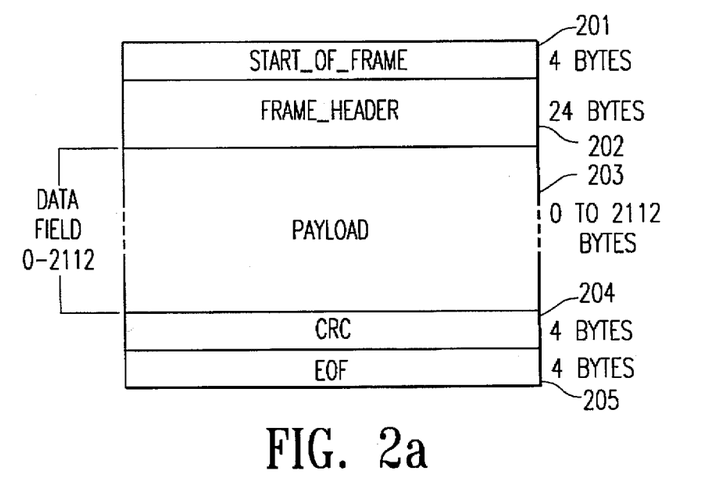
FIG. 2a and FIG. 2b are record structures that illustrate the organization of a frame in accordance with one embodiment of the present invention.
Figure 2B:
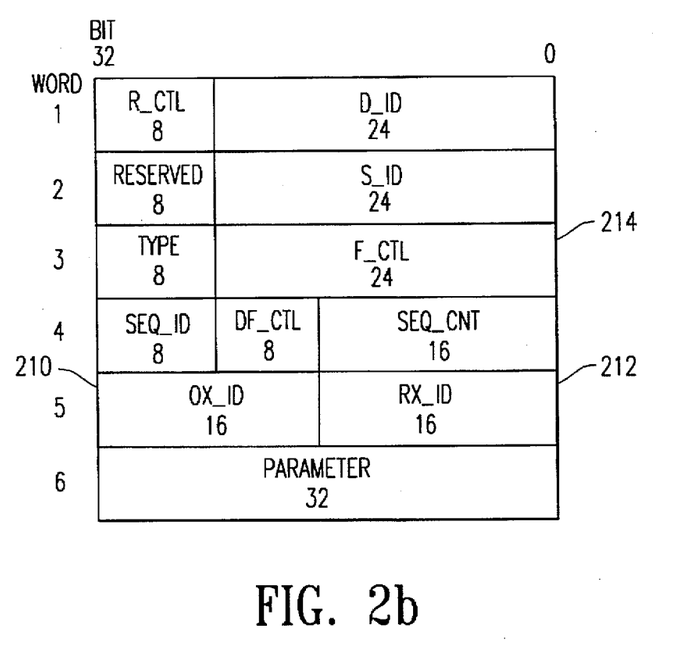

In accordance with the communications adapter 100 illustrated in FIG. 1, when the communications adapter 100 receives a frame, the frame is first received by the receive unit 114 in the protocol management engine 113 via bus signal lines 117. In accordance with one embodiment of the present invention, each frame is organized as shown in FIGS. 2a and 2b.

In accordance with the present invention, each received frame includes a start-of-frame field 201, a frame-header 202, a payload field 203, a cyclic redundancy field 204, and an end of frame field 205. Within the frame-header field 202 (shown in detail in FIG. 2b), identification information is present in several identification fields. Two such fields are Originator Exchange Identification (OX_ID) field 210 and Responder Exchange Identification (RX_ID) field 212. One of these two fields 210, 212 identifies the particular Exchange (i.e., group of data frames which belong to the same portion of a conversation between two devices) that includes the frame. Since each frame of a particular Exchange over the Fibre Channel link must be associated with the same remote port as each other frame associated with that same Exchange, the identification information is also used to indirectly identify a particular remote port from which the frame was sent, as will be seen from the discussion below.

The receive unit 114 in the protocol management engine 113 reads the identification information from a received frame and communicates a pointer or index (such as an "Exchange Index") associated with the identification information stored within the first cache 103. In at least one embodiment of the present invention in which the received frame is a Fibre Channel frame, the identification information is read from either the OX_ID field 210 or the RX_ID field 212, depending upon the state of an Exchange Originator/Responder bit within an F_CTL field 214. In at least one embodiment, the identification information read from the received frame is used directly as the Exchange Index. In alternative embodiments, the identification information is mapped to the Exchange Index by the receive unit 114, the protocol management engine 113, or the first cache controller 105. The Exchange Index is coupled from the protocol management engine 113 to the first cache controller 105 via signal line 119. In response to receipt of the Exchange Index, the first cache controller 105 attempts to find an Exchange Context associated with the received frame as indicated by the Exchange Index, in conventional fashion.

In accordance with the present invention, each Exchange Context includes an associated pointer or index into the second cache (such as a "Port Context Index"). Each Port Context Index (PCI) identifies a Port Context associated with the Exchange Context. If there is a hit in the first cache 103, then the PCI is communicated to the second cache controller 111 from the first cache 103 via signal line 121. In response to receipt of the PCI within the second cache controller 111, the second cache controller 111 attempts to find the Port Context identified by the PCI within the second cache 109. If there is a cache hit on the second cache 109 (i.e., both the caches 103, 109 contain the information being sought by the protocol management engine 113), then the coordination controller 110 enables the Exchange Context and Port Context to be output. More specifically, the Exchange Context and Port Context are preferably coupled to the control coordination controller 110 via signal lines 123 and 125 respectively. The coordination controller 110 allows both the Exchange Context and Port Context associated with the frame to be communicated to the protocol management engine 113 via signal line 127. In an alternative embodiment, direct outputs from the cache devices 103, 109 are enabled by a signal from the coordination controller 110.

If there is a miss in the first cache 103, then the first cache controller 105 signals the coordination controller 110 that amiss has occurred via signal line 129. In response, the coordination controller 110 determines whether there is a location available in the first cache 103 to store the requested Exchange Context. If not, then the coordination controller saves an Exchange Context from the cache into the context array 112, preferably using a direct memory access (DMA) operation into the context array 112 within the memory 107 via signal lines 131. Once space has been cleared within the first cache 103, the coordination controller 110 preferably performs a DMA read operation from the context array 112 within the memory 107 via signal lines 131 to read the Exchange Context associated with the frame received by the protocol management engine 113. If that frame is the first frame to be received by the communications adapter 100, then the coordination controller 110 will not find the Exchange Context in the context array 112. Therefore, the coordination controller 110 interrupts the microcontroller 101 via signal line 133. The microcontroller 101 negotiates an Exchange Context to be associated with each frame of that Exchange that is received in the future. In the process of negotiating the Exchange Context, the microcontroller 101 indicates which device will be the originator for the Exchange.

In accordance with the preferred embodiment of the present invention, the microcontroller 101 assigns a PCI as a part of the Exchange Context. If the port from which the frame originated had previously communicated with the communications adapter 100, then a Port Context will already have been negotiated. Accordingly, the same Port Context will be used that was previously used between that port and the communications adapter 100.

Therefore, there will already be a PCI associated with the port from which the frame was sent. If there is no Port Context stored within the context array associated with that port, then a new PCI is created.

Once the microcontroller 101 has completed the Exchange Context for that Exchange, the microcontroller 101 stores the Exchange Context in the context array 112 and sends the coordination controller 110 a copy of the Exchange Context to be stored in the first cache 103. Alternatively, the microcontroller 101 signals the coordination controller 110 to read the Exchange Context directly from the context array 112 in a DMA operation. The coordination controller 110 then applies the Exchange Context to a Write Path Controller 115. The Write Path Controller 115 is a state machine which controls the input to each of the two caches 103, 109. The Write Path Controller 115 prioritizes write operations to each cache 103, 109. That is, three different components may write to each cache 103, 109. The coordination controller 110 has the highest priority to write to each cache 103, 109. The protocol management engine 113 has the next highest priority to write to each cache 103, 109. The microcontroller 101 has the lowest priority to write to each cache 103, 109. The Write Path Controller 115 determines whether a device of higher priority is attempting to write to the cache concurrently. If so, then that device is allowed to write to each cache 103, 109 first. Since the coordination controller 110 has the highest priority, the coordination controller 110 writes the Exchange Context to the first cache 103 without delay, unless one of the other devices is already writing data to the first cache 103. The Write Path Controller 115 activates the write strobe to the cache 103, 109 to which the coordination controller 110 is writing via signal line 132 or 134 depending upon which cache 103, 109 is being written. The activation of the strobe to the cache is also coupled to the coordination controller 110 via signal line 135 as an acknowledgement that the write operation has been completed.

The first cache controller 105 then attempts again to access the Exchange Context from the first cache 103. The first cache 103 then outputs the PCI contained within the Exchange Context to the second cache controller 111 in the same fashion as if the Exchange Context had been previously found by a hit. The first cache controller 105 also signals a cache hit to the coordination controller 110. Accordingly, the second cache controller 111 attempts to find, within the second cache 109, the Port Context associated with the PCI.

If the Port Context is not found within the second cache 109, then the second cache controller 111 signals the coordination controller 110. The coordination controller 110 then ensures that a location in the second cache 109 is present within the second cache 109 for the requested Port Context by performing a DMA write of one of the Port Context already in the second cache 109 into the context array 112, if no location is available. The coordination controller 110 then attempts to find the Port Context within the context array 112. If the PCI is not currently associated with a Port Context (i.e., the PCI was created for this frame when the Exchange Context was generated), then the coordination controller 110 interrupts the microprocessor 101. The microcontroller 101 negotiates a Port Context and stores that Port Context in a location within the context array 112 that is associated with that PCI. The microcontroller 101 then sends a copy of the Port Context to the coordination controller 110 to be stored within the second cache 109. Alternatively, the microcontroller 101 signals the coordination controller 110 to perform a DMA read operation into the context array 112 to attempt again to read the Port Context.

The coordination controller 110 writes the Port Context into the second cache 109 via the Write Path Controller 115. The second cache controller 111 is then instructed by the coordination controller 110 to attempt to find the Port Context again. The second cache controller 111 then signals a hit to the coordination controller 110. Once the coordination controller 110 has received an indication that both caches have a hit, both the Exchange Context and the Port Context are provided from the caches 103, 109 to the protocol management engine 113 through the coordination controller 110.

The present invention operates similarly when a frame is to be transmitted from the communications adapter 100 to a remote port. When a frame is to be transmitted, the microcontroller 101 sends an Exchange Index and a PCI to the protocol management engine 113 via signal line 137. In response, the protocol management engine 113 sends a request to the first cache controller 105 to find the indicated Exchange Context via signal line 119. The request includes the Exchange Index associated with the Exchange of which the frame to be sent is a part. If the Exchange Context indicated by the Exchange Index is not present in the first cache 103, then the operation proceeds as described above. That is, the coordination controller 110 performs a DMA operation into the context array 112. The coordination controller 110 returns an Exchange Context to the Write Path Controller 115. The Write Path Controller 115 ensures that no request is already being serviced. The Write Path Controller 115 then writes the Exchange Context to the first cache 103. The first cache controller 115 is signalled to attempt to find the Exchange Context once again. The first cache controller then signals a hit to the coordination controller 110, and provides the second cache controller 111 with a PCI.

If the Port Context associated with the PCI is not present in the second cache 109, then the coordination controller 110 performs a DMA read to the context array 112. If the Port Context is not present invention context array 112, then the microcontroller 101 generates a new Port Context. In either case, the Port Context is provided to the coordination controller 110 and stored in the second cache 109. The second cache controller 111 again attempts to find the Port Context and signals a hit to the coordination controller 110. The coordination controller 110 then causes both the Exchange Context and the Port Context to be provided to the protocol management engine 113.

Figure 3:
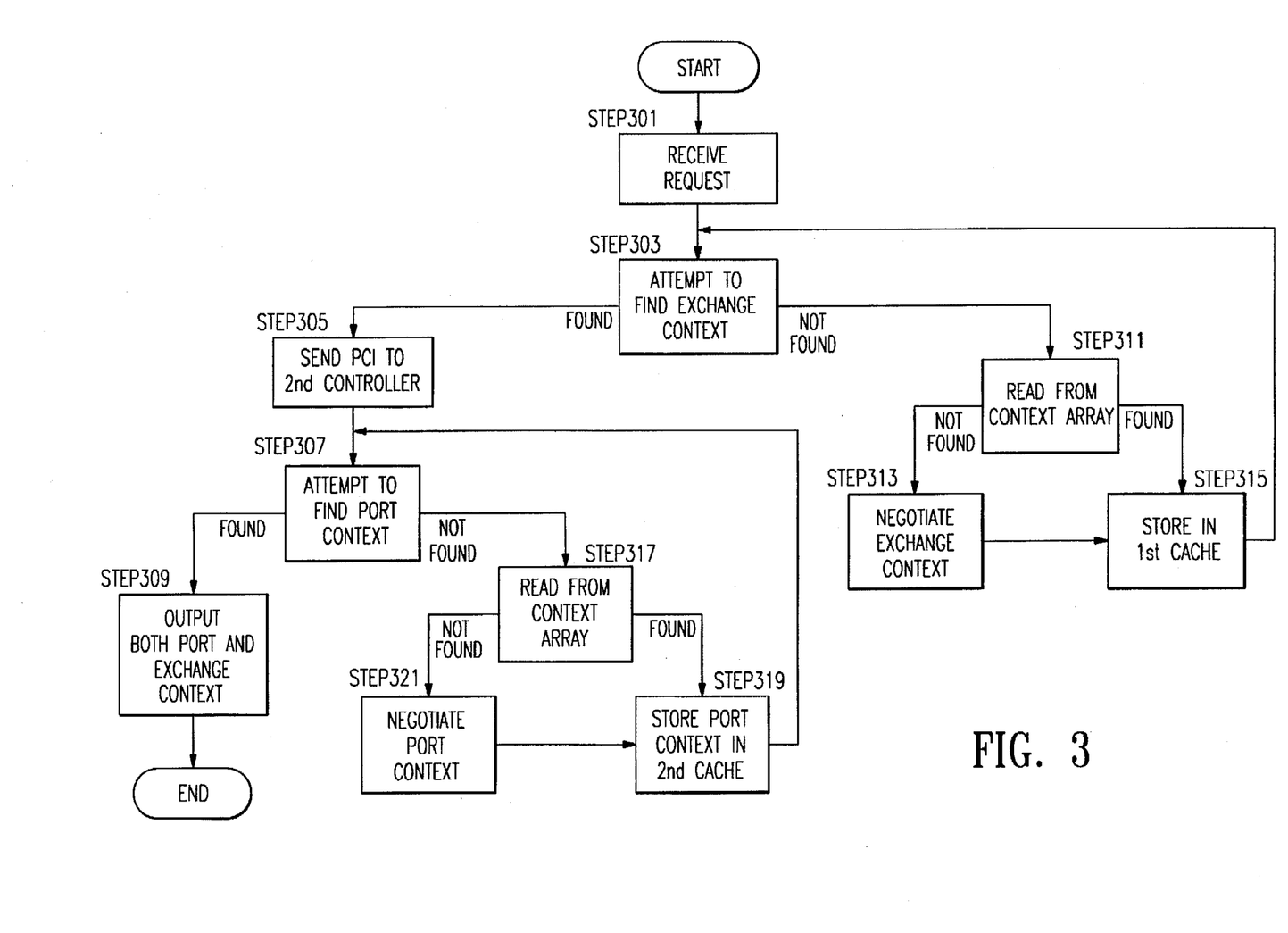
FIG. 3 is a high level flowchart describing one embodiment of the present invention.

FIG. 3 is a high level flowchart of the operation of the present invention. Initially, the first cache controller 105 receives a request for an Exchange Context (STEP 301). Next, the first cache controller 105 attempts to find the Exchange Context within the first cache 103 (STEP 303). If the Exchange Context is found, then the PCI is sent from the first cache 103 to the second cache controller 111 (STEP 305). The second cache controller 111 attempts to find the associated Port Context within the second cache 109 (STEP 307). If the second cache controller 111 finds the associated Port Context, then the coordination controller 110 is signalled and both the Exchange Context and the Port Context are output from the caches 103, 109 (STEP 309).

Returning to STEP 303, if the Exchange Context is not found, then the cache controller signals the coordination controller 110 to read the Exchange Context from the context array 112 (STEP 311). If the Exchange Context is not present within the context array 112, then the microcontroller 101 is interrupted and negotiates an Exchange Context (STEP 313). The Exchange Context is stored in the context array 112 (STEP 315). The process then returns to STEP 311 and the coordination controller 110 again attempts to read the Exchange Context from the context array 112 (STEP 311). This time the Exchange Context will be present. When the Exchange Context is found within the context array 112, the Exchange Context is stored in the first cache 103 (STEP 315). The first cache controller 105 then once again attempts to find the Exchange Context within the first cache 103 (STEP 303). This time the Exchange Context will be found. When the Exchange Context is found within the first cache 103, the process continues as described above.

If in STEP 307 the Port Context is not present in the second cache 109, then the coordination controller 110 is signalled and attempts to find the Port Context within the context array 112 (STEP 317). If the Port Context is present in the context array 112, then the Port Context is stored in the second cache 109 (STEP 319). If the Port Context is not present in the context array 112, then the coordination controller 110 interrupts the microcontroller 101 to negotiate a new Port Context (STEP 321). The Port Context is then stored in the second cache 109 (STEP 319). Once the Port Context is stored within the second cache 109, the second cache controller 111 again attempts to find the Port Context (STEP 307). The process then continues as described above.

The Exchange Context and Port Context are used by both the transmit and the receive functions. However, in accordance with the preferred embodiment of the present invention as used in a communications adapter, a single Exchange Context or Port Context may not be used for both receive and transmit operations at the same time. In the preferred embodiment of the present invention, each entry has both a transmission lock bit and a receive lock bit. When the entry is being used in connection with a frame that has been received, the receive lock bit associated with that entry is set. Likewise, when an entry is being used in connection with a frame that is to be transmitted, then the transmit lock bit is set. When a lock bit is set, the associated data may not be changed in either the context array 112 or the caches 103, 109. By use of these lock bits, coherency is maintained between the information that is stored in the context array 112 and the information that is maintained in each cache 103, 109. In accordance with the present invention, the context associated with any Port or Exchange can be updated by the protocol management engine 113 after the processing of a frame associated with that context. If information is to be updated by the protocol management engine 113, then the update is accomplished before the lock bit flag is reset. An update from the protocol management engine 113 is preferably accomplished by presenting the context update information to the Write Path Controller 115. The Write Path Controller 115 operates in the same general manner as when the coordination controller 110 is attempting to write to a cache 103, 109. That is, the Write Path Controller 115 routes information to be stored in the cache 103, 109 to the input of the desired cache 103, 109 in accordance with the priority described above. Then the Write Path Controller 115 activates the write strobe over signal line 132 or 134 depending upon which cache 103, 109 is being written.

In addition, a test capability is preferably available in which the microcontroller 101 can write directly to a cache 103, 109. Such write operations are performed through the Write Path Controller 115 in the same general fashion as described above. That is, the microcontroller 101 couples the information to be written to the Write Path Controller 115. The Write Path Controller 115 determines whether any other write operation is either pending or in progress. If not, then the Write Path Controller 115 routes the information to be stored to the appropriate cache 103, 109 and activates a strobe on either signal line 132 or signal line 134.

If the microcontroller 101 attempts to read the from either cache 103, 109, the information must be searched by the appropriate cache controller 105, 111. The coordination controller 110 transfers the information to the microcontroller 101. For example, the microcontroller 101 may request an Exchange Context from the first cache 103 through the first cache controller 105. The information is provided to the coordination controller 110, which saves the information into the microcontroller 101 memory 107, or alternatively, into a register in the microcontroller 101.

It will be understood by those skilled in the art that a principal advantage of the present invention is that the total size of a cache may be reduced by using two linked caches to store related information, such that a second unit of information associated with more than one first unit of information is not stored more than once, thus reducing the size of the cache and increasing the likelihood of a hit when searching the cache.

A number of embodiments of the present invention have been described. Nevertheless, it will be understood that various modifications may be made without departing from the spirit and scope of the invention. For example, the linked caches of the present invention may be used in any system in which a cache is used to store first units of information associated with a second unit of information. For example, in a database in which addresses are stored in a cache, the street address may be stored in a first cache with an index into a second cache which stores the city, state, and zip code associated with the address. Accordingly, any device may be coupled to the linked caches and the coordination controller 110 to request that information be read from the linked caches.

The first and second cache controllers and the coordination controller of the present invention may be implemented in either hardware or software. If implemented in hardware, the present invention will be faster and may be more appropriate for use in a Fibre Channel communications adapter. However, for other applications in which speed is not as critical, a software implementation of the present invention may be acceptable, and even preferred.

In an alternative embodiment of the present invention, the first and second cache controllers may be implemented in a single controller that is shared by both the first and second caches. Furthermore, the first and second caches 103, 109 may be implemented in adjacent sections of the same memory device. Still further, the first and second caches may be intermingled such that entries to the first cache are not contiguous and are interspersed with entries to the second cache. In fact, in at least one embodiment of the present invention, the first and second caches 103, 109 may be considered to be a single cache, with separate entries to the cache for each Exchange Context and each Port Context, such that each Exchange Context entry has a PCI to an associated Port Context stored at a discrete location within the cache.

Accordingly, it is to be understood that the invention is not to be limited by the specific illustrated embodiment, but only by the scope of the appended claims.

We claim:

1. A linked cache memory for storing units of information, the units of information being a first and second subset of units of information stored in a related memory device, including:
   (a) a first cache device for storing the first subset of the information;
   (b) a second cache device for storing the second subset of the information;
   (c) a cache controller, coupled to the first and second cache devices for:
      (1) receiving from an external device a first index;
      (2) searching the first cache device for a first unit of information associated with the first index;
      (3) outputting a first indication that the first unit of information was found, if the first unit of information is presently stored within the first cache device;
      (4) receiving from the first cache device a second index embedded within the first unit of information;
      (5) searching the second cache device for a second unit of information associated with the second index; and
      (6) outputting a second indication that the second unit of information was found, if the second unit of information is present within the second cache device;
   (d) a coordination controller, coupled to the cache controller, for receiving from the cache controller the first and second indications that the first and second cache devices have found the first and second units of information, and in response to such receipt of such indications, enabling outputting of the first and second units of information; and
   (e) a write path controller, coupled to the coordination controller and the first and second cache devices, for coupling input signals from one of a plurality of sources to inputs of the first or the second cache, and for indicating to the source of the input signal that input data represented by the input signal has been stored in a cache device.

2. The linked cache memory device of claim 1, wherein the first and second memory devices each have a shorter read time than the related memory device.

3. The linked cache memory of claim 1, wherein the write path controller is further for determining which of the plurality of sources has priority when a plurality of input sources are attempting to write information to a cache concurrently, and for coupling the input signal which originates from the source with the highest priority to the cache device first.

4. A linked cache memory for storing units of information, the units of information being a first and second subset of units of information stored in a related memory device, including:
   (a) a first cache device for storing the first subset of the information;
   (b) a second cache device for storing the second subset of the information;
   (c) a cache controller, coupled to the first and second cache devices for:
      (1) receiving from an external device a first index;
      (2) searching the first cache device for a first unit of information associated with the first index;
      (3) outputting a first indication that the first unit of information was found, if the first unit of information is presently stored within the first cache device;

(4) receiving from the first cache device a second index embedded within the first unit of information;

(5) searching the second cache device for a second unit of information associated with the second index; and (6) outputting a second indication that the second unit of information was found, if the second unit of information is present within the second cache device;

(d) a coordination controller, coupled to the cache controller, for receiving from the cache controller the first and second indications that the first and second cache devices have found the first and second units of information, and in response to such receipt of such indications, enabling outputting of the first and second units of information, wherein the coordination controller is capable of performing a direct memory access operation to read information from the related memory device.

5. A linked cache memory for storing units of information, the units of information being a first and second subset of units of information stored in a related memory device, including:

(a) a first cache device for storing the first subset of the information;

(b) a second cache device for storing the second subset of the information;

(c) a cache controller, coupled to the first and second cache devices for:

(1) receiving from an external device a first index;

(2) searching the first cache device for a first unit of information associated with the first index;

(3) outputting a first indication that the first unit of information was found, if the first unit of information is presently stored within the first cache device;

(4) receiving from the first cache device a second index embedded within the first unit of information;

(5) searching the second cache device for a second unit of information associated with the second index; and (6) outputting a second indication that the second unit of information was found, if the second unit of information is present within the second cache device;

(d) a coordination controller, coupled to the cache controller, for receiving from the cache controller the first and second indications that the first and second cache devices have found the first and second units of information, and in response to such receipt of such indications, enabling outputting of the first and second units of information; and (e) a lock means for locking the first and second cache devices to prevent a particular unit of information from being altered when that unit of information is in use; wherein the first unit of information is an exchange context and the second unit of information is a port context, the exchange context and the port context being associated with a frame of data which is either being transmitted or received, and wherein the lock means activates a receive lock bit when a port context or exchange context is being used in association with a received frame.

6. A linked cache memory for storing units of information, the units of information being a first and second subset of units of information stored in a related memory device, including:

(a) a first cache device for storing the first subset of the information;

(b) a second cache device for storing the second subset of the information;

(c) a cache controller, coupled to the first and second cache devices for:

(1) receiving from an external device a first index;

(2) searching the first cache device for a first unit of information associated with the first index;

(3) outputting a first indication that the first unit of information was found, if the first unit of information is presently stored within the first cache device;

(4) receiving from the first cache device a second index embedded within the first unit of information;

(5) searching the second cache device for a second unit of information associated with the second index; and (6) outputting a second indication that the second unit of information was found, if the second unit of information is present within the second cache device;

(d) a coordination controller, coupled to the cache controller, for receiving from the cache controller the first and second indications that the first and second cache devices have found the first and second units of information, and in response to such receipt of such indications, enabling outputting of the first and second units of information; and (e) a lock means for locking the first and second cache devices to prevent a particular unit of information from being altered when that unit of information is in use; wherein the first unit of information is an exchange context and the second unit of information is a port context, the exchange context and the port context being associated with a frame of data which is either being transmitted or received, and wherein the lock means activates a transmit lock bit when a port context or exchange context is being used in association with a frame to be transmitted.

7. A communications adapter within a host, for receiving and transmitting frames of data, including:

(a) a memory device for storing context data including exchange context information and port context information;

(b) a first cache device having shorter read times than the memory device, for storing a subset of the exchange context information;

(c) a second cache device having shorter read times than the memory device, for storing a subset of the port context information;

(d) a cache controller, coupled to the first and second cache device for:

(1) receiving from an external device a first index;

(2) searching the first cache device for an exchange context associated with the first index;

(3) outputting a first indication that the exchange context was found, if the exchange context being associated with the first index is presently stored within the first cache device;

(4) receiving from the first cache device a second index embedded within the exchange context;

(5) searching the second cache device for a port context associated with the second index; and (6) outputting a second indication that the port context associated with the second index was found, if the port context is present within the second cache device;

(e) a coordination controller, coupled to the cache controller, for receiving from the cache controller the first and second indications that the first and second cache devices have found the exchange context and port context associated with the first and second index, and enabling outputting of the exchange context and port context in response to receiving both the first and second indications; and (f) a microcontroller, coupled to the memory device and to the coordination controller, for generating exchange context and port context information to be stored within the memory device upon receipt of a request from the coordination controller, and for directly writing to the first and second cache device.

8. The communications adapter of claim 7, further including a protocol management engine, coupled to the coordination controller, the microcontroller, and the cache controller, for:

(a) receiving a frame of data transmitted to the host over a communications link;

(b) determining a first index associated with the frame of data;

(c) communicating the first index to the cache controller;

(d) receiving the exchange context and port context information associated with the first and second index if the exchange context is present in the first cache device and port context information is present in the second cache device; and (e) using the exchange context and port context to process the received frame of data.

9. The communications adapter of claim 7, further including a protocol management engine, coupled to the coordination controller, the microcontroller, and the cache controller, for:

(a) receiving a frame of data to be transmitted over a communications link from the host;

(b) receiving a first index associated with the frame of data;

(c) communicating the first index to the cache controller;

(d) receiving the exchange context and port context information associated with the first and second index if the exchange context is present in the first cache device and port context information is present in the second cache device; and (e) using the exchange context and port context to process the frame of data to be transmitted.

10. The inventions of claims 1, 4, 5, 6, or 7, in which:

(a) the outputs from the first and second cache devices are coupled to the coordination controller;

(b) the first unit of information associated with the first index and second unit of information associated with the second index are received from the first and second cache devices, respectively, if found; and (c) the coordination controller outputs the first and second units of information only if the first and second indications have been received.

11. A method for storing and retrieving units of information in a linked cache device having a first memory device and a second memory device, and a cache controller, the first and second memory devices each having units of information stored within that are a first and second subset, respectively, of units of information stored in a related external memory device, including the steps of:

(a) receiving from an external control device a first index;

(b) searching the first memory device for a first unit of information associated with the first index;

(c) communicating a first indication that the first unit of information was found, if the first unit of information is presently stored within the first cache device;

(d) receiving from the first memory device a second index embedded within the first unit of information;

(e) searching the second cache device for a second unit of information associated with the second index;

(f) outputting a second indication that the second unit of information was found, if the second unit of information is present within the second cache device;

(g) if the first unit of information associated with the first index is not present in the first cache device, then:

(1) performing a direct memory access operation into the related external memory device to read the first unit of information associated with the first index and store that first unit of information in the first cache device;

(2) communicating a first indication that the first unit of information associated with the first cache device is presently within the first cache device;

(h) if the second unit of information associated with the second index is not present in the second cache device, then:

(1) performing a direct memory access operation into the related external memory device to read the second unit of information associated with the second index and store that second unit of information in the second cache device; and (2) communicating a second indication that the second unit of information associated with the second cache device is presently within the second cache device.

12. A method for storing and retrieving units of information in a linked cache device having a first memory device and a second memory device, and a cache controller, the first and second memory devices each having units of information stored within that are a first and second subset, respectively, of units of information stored in a related external memory device, including the steps of:

(a) receiving from an external control device a first index;

(b) searching the first memory device for a first unit of information associated with the first index;

(c) communicating a first indication that the first unit of information was found, if the first unit of information is presently stored within the first cache device;

(d) receiving from the first memory device a second index embedded within the first unit of information;

(e) searching the second cache device for a second unit of information associated with the second index;

(f) outputting a second indication that the second unit of information was found, if the second unit of information is present within the second cache device;

(g) receiving from the cache controller the first and second indications that the first and second cache devices have found the first and second unit of information;

(h) enabling outputting of the first and second unit of information in response to receiving both the first and second indications; and (i) performing a direct memory access operation to read information from the external memory device.

13. A method for storing and retrieving units of information in a linked cache device having a first memory device and a second memory device, and a cache controller, the first and second memory devices each having units of information stored within that are a first and second subset, respectively, of units of information stored in a related external memory device, including the steps of:

(a) receiving from an external control device a first index;

(b) searching the first memory device for a first unit of information associated with the first index, the first unit of information being an exchange context;

(c) communicating a first indication that the first unit of information was found, if the first unit of information is presently stored within the first cache device;

(d) receiving from the first memory device a second index embedded within the first unit of information;

(e) searching the second cache device for a second unit of information associated with the second index, the second unit of information being a port context;

(f) outputting a second indication that the second unit of information was found, if the second unit of information is present within the second cache device;

(g) receiving from the cache controller the first and second indications that the first and second cache devices have found the first and second unit of information;

(h) enabling outputting of the first and second unit of information in response to receiving both the first and second indications; and (i) locking the first and second memory devices to prevent a particular unit of information from being altered when that unit of information is in use;

(j) associating the exchange context and the port context with a frame of data which is either being transmitted or received; and (k) activating a receive lock bit when the port context or the exchange context is being used in association with a received frame.

14. A method for storing and retrieving units of information in a linked cache device having a first memory device and a second memory device, and a cache controller, the first and second memory devices each having units of information stored within that are a first and second subset, respectively, of units of information stored in a related external memory device, including the steps of:

(a) receiving from an external control device a first index;

(b) searching the first memory device for a first unit of information associated with the first index, the first unit of information being an exchange context;

(c) communicating a first indication that the first unit of information was found, if the first unit of information is presently stored within the first cache device;

(d) receiving from the first memory device a second index embedded within the first unit of information;

(e) searching the second cache device for a second unit of information associated with the second index, the second unit of information being a port context;

(f) outputting a second indication that the second unit of information was found, if the second unit of information is present within the second cache device;

(g) receiving from the cache controller the first and second indications that the first and second cache devices have found the first and second unit of information;

(h) enabling outputting of the first and second unit of information in response to receiving both the first and second indications; and (i) locking the first and second memory devices to prevent a particular unit of information from being altered when that unit of information is in use;

(j) associating the exchange context and the port context with a frame of data which is either being transmitted or received; and (k) activating a transmit lock bit when the port context or the exchange context is being used in association with a frame to be transmitted.

* * * * *